Sept. 29, 1970    E. BAERLECKEN    3,531,279
FERRITIC COLUMBIUM CONTAINING, CHROMIUM-MOLYBDENUM
STEEL, CONTAINING NICKEL
Filed Dec. 3, 1965
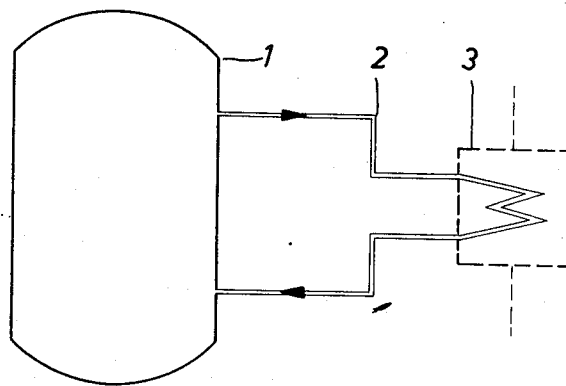
Inventor:
EWALD BAERLECKEN
BY BURGESS DINKLAGE & SPRUNG
ATTORNEYS

United States Patent Office 3,531,279
Patented Sept. 29, 1970

3,531,279
FERRITIC COLUMBIUM CONTAINING, CHROMIUM - MOLYBDENUM STEEL, CONTAINING NICKEL
Ewald Baerlecken, Dusseldorf, Germany, assignor, by mesne assignments, to August Thyssen-Hutte Aktiengesellschaft, Duisburg-Hamborn, Germany, a corporation of Germany
Filed Dec. 3, 1965, Ser. No. 511,426
Claims priority, application Germany, Dec. 5, 1964,
P 24,450
Int. Cl. C22c 39/14
U.S. Cl. 75—128    5 Claims

ABSTRACT OF THE DISCLOSURE

Reduction in toughness of ferritic steels resulting from including columbium in the steel for the purpose of reducing the susceptibility of the steel to decarbonization, is effected by including 0.3–1.0% nickel in the steel. Such steels can be used in the cooling system of sodium cooled nuclear reactors, wherein austenitic steels are in the reactor.

---

This invention relates to vessels, pipes, ducts or like hollow components. More particularly the invention relates to vessels, pipes, ducts or like hollow steel components for containing or conveying a fluid that is capable of transporting carbon, and especially for conveying the liquid sodium in a sodium-cooled reactor.

Materials, such as austenitic and ferritic steels which differ in their affinity for carbon tend to carburise and decarburise by a process of carbon diffusion when they are both in contact with a fluid that is capable of transporting carbon, such as a gas mixture of $H_2$ and $Ch_4$ or CO and $CO_2$ or a molten metal, such as liquid sodium. Ferritic steels cannot be used in the circulating systems of sodium-cooled nuclear reactors in which locally the coolant is also in contact with austenitic steels, as employed for instance for cladding the fuel, because the austenitic steel may be carburised by the carbon conveyed in the sodium. On the other hand, for reasons of cost as well as for technological reasons the widest possible use of ferritic steels would be most desirable.

In order to prevent the transportation of carbon it has already been proposed to bind the carbon in the ferritic steels by an addition of the carbide-forming element columbium. In a steel works it is in practice nevertheless impossible to provide the precise stoichiometric quantity of columbium, which is about eight times the quantity of the carbon, for completely bonding the carbon and there is always the risk that there may be a deficiency of columbium. It is therefore advisable to provide an excess of columbium amounting to about ten times and even more of the quantity of the carbon contained in the steel. However, when this is done the toughness of the steel is impaired. This is probably due to precipitation of the columbian in the steel. These facts appear to preclude the possibility of providing a stoichiometric excess of columbium and at the same time of maintaining the necessary toughness of the steel.

It is therefore the object of the present invention to provide vessels, pipes, ducts and like hollow components consisting of a ferritic steel that will not yield carbon to a contacting fluid which is capable of transporting carbon and which is contained or conveyed in said components.

More particularly it is the object of the present invention to bind the carbon in the ferritic steel by providing the steel with an excess of columbium without impairing its toughness, and it is a more specific object of the invention to provide components which can be used in a sodium-cooled nuclear reactor.

Surprisingly it has been found that these objects can be achieved by providing the steel with a small content of nickel, up to about 1.0%.

The invention therefore consists in providing vessels, pipes, ducts and like hollow components containing fluids capable of transporting carbon, particularly for use in sodium-cooled nuclear reactors, which are made of a steel alloy of a composition within the following range:

|  | Percent |
|---|---|
| Chromium | 0.7–3 |
| Molybdenum | 0.4–2 |
| Manganese | Up to 1.5 |
| Silicon | Up to 0.7 |
| Carbon | 0.3–1.0 |
| Nickel | Up to 0.1 | and a columbium content exceeding 10 times the quantity of the carbon, the remainder being iron and the usual accompanying elements and impurities.

A preferred steel alloy for the said components consists of

|  | Percent |
|---|---|
| Chromium | 2.0–2.5 |
| Molybdenum | 0.9–1.1 |
| Manganese | 0.4–0.8 |
| Silicon | Up to 0.7 |
| Nickel | 0.4–0.8 |
| Carbon | 0.04–0.08 | and a columbium content of at least 10 times the percentage content of carbon, the remainder being iron and the usual accompanying elements and impurities.

At room temperature hollow components made of the above steels have a tensile strength of 45 to 60 kp./sq. mm., a yield point of at least 20 kp./sq. mm., an elongation ($L_0 = 5d$) of at least 20% and a notch impact strength (DVM transverse impact test) of at least 4 mkp./sq. cm.

It is advisable to keep within an upper limit for the columbium content and it is proposed that this should not exceed $10 \times \text{percent C} + 0.4\%$.

An embodiment of a hollow component of the kind proposed by the present invention is illustratively shown in the accompanying drawing, but this is not intended to limit the applications of components consisting of a steel according to the present invention.

A reactor vessel 1 is connected by pipes 2 to a heat exchanger 3. These parts are provided with the necessary fittings, orifices, flanges and so forth. The reactor vessel, pipes, heat exchanger tubes and fittings which conduct liquid sodium are made of the following steel alloy:

|  | Percent |
|---|---|
| C | 0.073 |
| Si | 0.24 |
| Mn | 0.72 |
| Mo | 1.01 |
| Cr | 2.31 |
| Ni | 0.61 |
| Nb | 1.05 |
| N | 0.003 | remainder iron and the usual accompanying elements and impurities.

At room temperature this hollow component has a tensile strength of 51.0 kp./sq. mm., a yield point of 29.6 kp./sq. mm., an elongation ($L_0 = 5d$) of 30% and a notch impact strength of 10 mkp./sq. cm.

The columbium may be partly or wholly replaced by tantalum in which case two parts of tantalum are equivalent to one part of columbium. If the steel contains more than about 0.01% nitrogen, it is advisable to raise the above specified columbium contents to ensure that all the carbon will be bound despite the bond that forms between the nitrogen and some of the columbium.

The advantage of the hollow body according to the invention is that no diffusion of carbon into another material, such as an austenitic steel, can take place and that nevertheless the mechanical properties of the component at room temperature and at elevated temperatures are completely satisfactory. It is contemplated to use the proposed hollow components principally in the construction of sodium-cooled nuclear reactors.

We claim:

1. A ferritic columbium containing, chromium-molybdenum steel withstanding decarburization in circulating systems, the circulating fluid of which has itself no carburizing property at the operating temperature, but is capable of decarburizing ferritic steels and to convey said carbon to a part of the circulating system, consisting of a metal which would be carburized by said carbon, and which possesses high toughness, comprising:

|  | Percent |
|---|---|
| Chromium | 0.7–3 |
| Molybdenum | 0.4–2 |
| Manganese | Up to 1.5 |
| Silicon | Up to 0.7 |
| Nickel | 0.3–1.0 |
| Carbon, and a columbium content exceeding 10 times the carbon content | Up to 0.1 |

The remainder being iron.

2. Steel according to claim 1, and containing:

|  | Percent |
|---|---|
| Chromium | 2.0–2.5 |
| Molybdenum | 0.9–1.1 |
| Manganese | 0.4–0.8 |
| Silicon | Up to 0.7 |
| Nickel | 0.4–0.8 |
| Carbon | 0.04–0.08 |

3. Steel according to claim 1, the columbium content not exceeding 10 times the percentage of carbon plus 0.4%.

4. Steel according to claim 1, wherein at least part of the columbium is replaced by tantalum in the proportion of 2 parts of tantalum for 1 part of columbium.

5. Steel according to claim 1, and containing more than 0.01% nitrogen and in which the columbium content is increased to provide the quantity of columbium that will be bound by the nitrogen.

References Cited

UNITED STATES PATENTS

| 2,968,549 | 1/1961 | Brady | 75—128.6 |
| 3,290,183 | 12/1966 | Ohtake | 75—128.6 |
| 3,079,995 | 3/1963 | Natland | 176—87 X |
| 3,093,567 | 6/1963 | Jabonski | 176—87 X |
| 3,301,668 | 1/1967 | Cope | 176—91 X |

HYLAND BIZOT, Primary Examiner

PO-1050
(5/69)

UNITED STATES PATENT OFFICE
CERTIFICATE OF CORRECTION

Patent No. 3,531,279      Dated Sept. 29, 1970

Inventor(s) Ewald Baerlecken

It is certified that error appears in the above-identified patent and that said Letters Patent are hereby corrected as shown below:

Col. 3, lines 28 and 29, cancel "Carbon, and a columbium content exceeding...Up to 0.1" and substitute therefor:

--Carbon------------------------Up to 0.1 and a columbium content exceeding 10 times the carbon content--.

Col. 2, line 16, change "Carbon" to --Nickel--;
            line 17, change "Nickel" to --Carbon--.

SIGNED AND
SEALED
JAN 19 1971

(SEAL)
Attest:

Edward M. Fletcher, Jr.
Attesting Officer

WILLIAM E. SCHUYLER, JR.
                                               Commissioner of Patents